United States Patent [19]

Lintz et al.

[11] Patent Number: 5,419,975
[45] Date of Patent: May 30, 1995

[54] INORGANIC CERAMIC PAPER, ITS METHOD OF MANUFACTURE AND ARTICLES PRODUCED THEREFROM

[75] Inventors: Timothy S. Lintz, Grand Island; Ralph W. Paddock, Newfane, both of N.Y.

[73] Assignee: The Carborundum Company, Niagara Falls, N.Y.

[21] Appl. No.: 156,378

[22] Filed: Nov. 22, 1993

[51] Int. Cl.⁶ ................................................ B32B 9/00
[52] U.S. Cl. ................................... 428/688; 428/113; 428/212; 428/325
[58] Field of Search ............... 428/688, 195, 113, 212, 428/325, 688; 264/63; 501/95

[56] References Cited

U.S. PATENT DOCUMENTS

| | | | |
|---|---|---|---|
| 4,806,206 | 2/1989 | Kamijo et al. | 162/145 |
| 5,053,107 | 10/1991 | Barber, Jr. | 162/145 |
| 5,145,811 | 9/1992 | Lintz et al. | 501/95 |
| 5,320,791 | 6/1994 | Saitou et al. | 264/63 |

OTHER PUBLICATIONS

"Carborundum: A Continuing Commitment to Quality" *Ceramic Bulletin* vol. 69, No. 3, pp. 345–348 (Mar., 1990).
R. M. Downs, Jr., "ASTM Inflatable Restraint Standards" *ASTM Standardization News*, Jul. 1991.
D. J. Bailey, "Ceramic Fiber Papers: Insulation for Earthly Industries and Beyond."

*Primary Examiner*—Patrick J. Ryan
*Assistant Examiner*—William A. Krynski
*Attorney, Agent, or Firm*—Renner, Kenner, Greive, Bobak, Taylor & Weber

[57] ABSTRACT

An inorganic ceramic paper includes inorganic ceramic fibers and an inorganic binder system of fibers consisting essentially of silica. The binder system initially includes organic materials as well as the silica fibers, however, the organic materials are burned out of the ceramic paper. The silica fibers remain and flow so as to maintain the structure and integrity of the ceramic paper and hold the ceramic fibers together. Such a ceramic paper is useful in a variety of applications and is particularly useful as a filter in the inflator unit of an automotive airbag.

19 Claims, 1 Drawing Sheet

INORGANIC CERAMIC PAPER, ITS METHOD OF MANUFACTURE AND ARTICLES PRODUCED THEREFROM

TECHNICAL FIELD

The present invention relates generally to ceramic paper and its method of manufacture. More particularly, the invention relates to inorganic ceramic papers for use in high temperature environments having high strength and good flexibility, porosity, and rollability properties. Specifically, the invention relates to inorganic ceramic paper bound together by silica fibers and being free of all organic materials. Such ceramic paper is especially useful in the manufacture of air bag filters.

BACKGROUND OF THE INVENTION

Ceramic paper generally refers to high temperature resistant, insulating inorganic sheet material having a thickness of up to ¼ of an inch and predominantly comprising ceramic fibers. Such materials are referred to as "paper" because of their resemblance to wood pulp papers and because they can be rolled on conventional papermaking machines. Such paper is used for a wide variety of household and industrial applications. Recently, the automotive industry has become interested in ceramic paper for use in the inflator filter units of automotive airbags.

In particular, the automotive airbag manufacturers are attempting to make more efficient use of the propellant or generant, which is very expensive, by designing inflators which burn hotter. The hotter burning inflators result in optimizing reaction completion which, in turn, allows the airbag manufacturer to use less propellant or generant in the inflator, and thus, reduce cost.

However, such a very high output inflator is useless without a compatible ceramic paper filter material which is strong enough, flexible enough, and porous enough to withstand the high output blast to which it is subjected. Furthermore, any such ceramic paper filter material must be free of organics so that outgassing does not add to the internal combustion pressure and temperature or to the toxicity of the gas.

More specifically, an inflator filter unit of ceramic paper desirably should have a minimum standard for tensile strength of at least about 195 gm/cm (500 grams/inch), preferably 315 gm/cm (800 grams/inch) and minimum low pressure/high flow rate of about 1.84 cubic meters per minute (65 cubic feet per minute). Also, any such filter unit should be organic-free (0% Loss On Ignition) and exhibit no dustiness.

Heretofore, ceramic papers relied principally on latex, polyvinyl acetate and phenolic resin type binders for achieving required tensile strength properties. However, as noted hereinabove, upon exposure to high temperatures, these organic binders would frequently burn out, causing outgassing which would result in a loss of tensile strength for the paper and the release of combustion products into the atmosphere, and when used in airbag inflators, would increase the temperature and pressure to variable levels, a result which is not desired. Air bag inflator filters today employ at least some organic binder material, typically, about three percent (3%). However, even this rather low amount of organic binder may create variations in temperature and pressure.

In an effort to overcome this problem of outgassing, one alternative which has been tried was the production of an inorganic sheet without organic binders. However, virtually all attempts to prepare inorganic ceramic papers have so far proven unsuccessful in one way or another. Some attempts yielded very weak products, e.g., burn grade papers, while others resulted in formulating papers with limited flexibility and rollability. For example, Barber, Jr. U.S. Pat. No. 5,053,107 provides high temperature resistant, insulating inorganic ceramic papers for use in high temperature environments which do not include any organic binders. Instead, the ceramic paper produced in this patent is held together by fiberglass fibers such as E glass, ranging in length from 100 $\mu$m to 0.75 inches in place of the organic binders. In fact, the fiberglass fibers are actually melted to the ceramic fibers. Notably, however, these ceramic papers become brittle at temperatures greater than 1400° F. and are otherwise not easily rolled. Moreover, this ceramic paper is not nearly as flexible as is required for use in inflator units.

Thus, while substantial effort has been made to prepare organics-free papers with high tensile strength, good flexibility, porosity and flow properties, retaining these properties in the same inorganic ceramic paper at commercially acceptable levels has not previously been achieved.

Accordingly, a need exists for a strong, porous, flexible and rollable ceramic paper which is free of all organic binders. Such ceramic paper would be very beneficial to air bag manufacturers in the development of an organics-free inflator filter unit.

SUMMARY OF INVENTION

It is therefore a primary object of the present invention to provide an inorganic ceramic paper which is free of organic materials at the time of use.

It is another object of the present invention to provide an inorganic ceramic paper, as above, which possesses the desired strength, porosity, flow, and flexibility characteristics for certain desired applications.

It is another object of the present invention to provide an inorganic ceramic paper, as above, which conforms to the characteristics required for use as an inflator filter unit in automotive airbags.

It is another object of the present invention to provide an inflator filter unit for use in airbags including an inorganic ceramic paper material.

It is a further object of the present invention to provide an inflator filter unit as above, which, because of its porosity, allows the generant or propellant to burn more efficiently and thus reduce the cost of the unit.

One or more of the foregoing objects together with the advantages thereof over the known art relating to ceramic papers, which shall become apparent from the specification which follows, are accomplished by the invention as hereinafter described and claimed.

In general, the present invention provides an inorganic ceramic paper comprising inorganic ceramic fibers and an inorganic binder system of fibers consisting essentially of silica, the ceramic paper being porous and free of all organic materials.

The present invention also provides inorganic ceramic paper including a composition of inorganic ceramic fibers and an inorganic binder system of fibers consisting essentially of silica produced by mixing the inorganic ceramic fibers, the silica fibers and a plurality of organic materials into a mixture or slurry; forming a ceramic paper mat from the mixture or slurry; and burn-

PREFERRED EMBODIMENT FOR CARRYING OUT THE INVENTION

Figure 1:
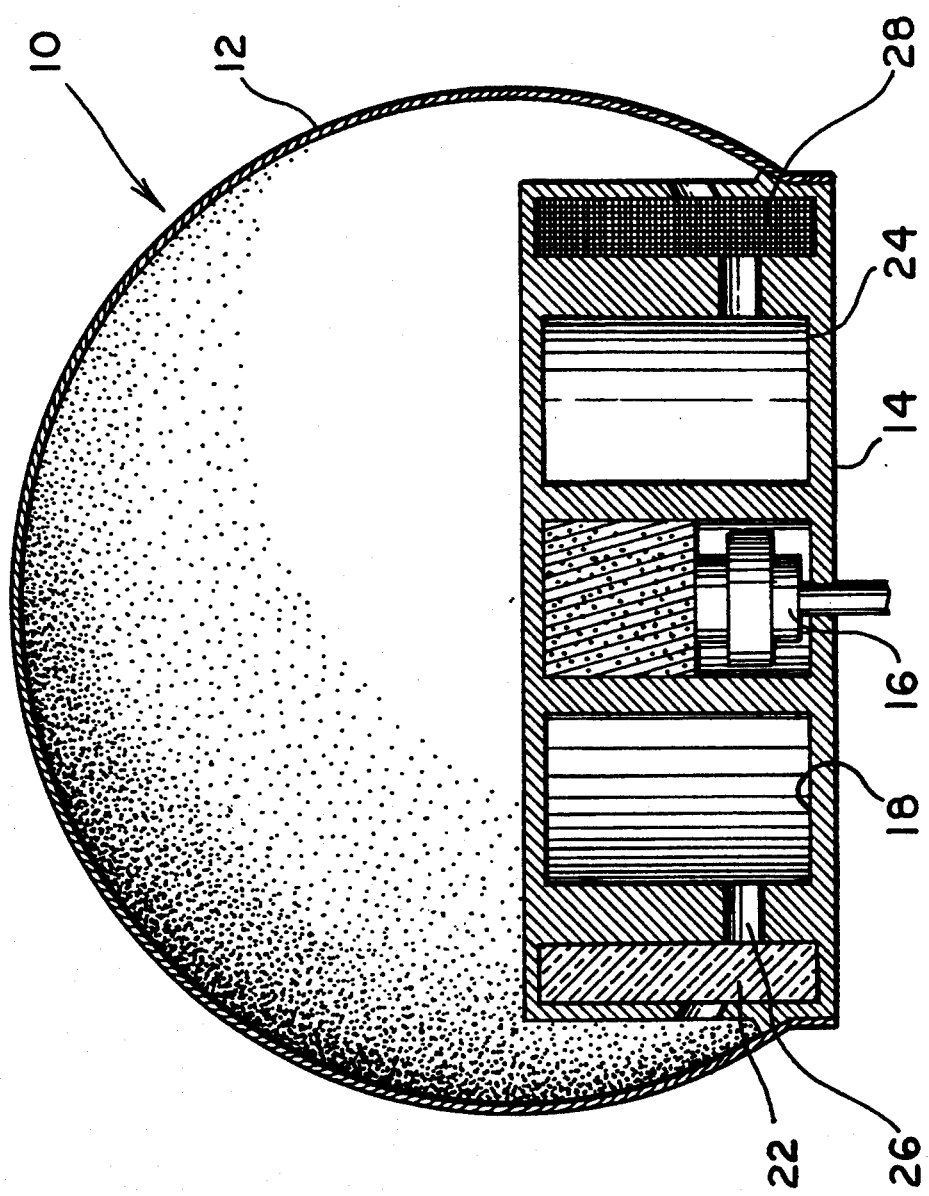
FIG. 1 is a sectional view of an airbag module having an inflator filter unit according to the concept of the present invention.

As noted hereinabove, the present invention is directed toward ceramic papers which have high strength and good flexibility and which are organics-free. Preferably, the inorganic ceramic papers disclosed herein have a tensile strength of at least about 500 grams per inch, preferably about 800 grams per inch, a flow rate (permeability) of at least 65 cubic feet per minute, and 0 percent Loss On Ignition (LOI) exclusive of water vapor. Lower tensile strength can be tolerated if the paper possesses good handleability, such as good elongation or elasticity without breakage. The permeability is also a feature of the porosity of the paper required for the applications set forth below. Specifically, flow rates of less than 65 cubit feet per minute are associated with nonporous or insufficiently porous paper, and therefore, will not work in the high-flow applications noted herein. Preferably, a flow rate of at least 200 cubic feet per minute is desired.

The ceramic papers of the present invention have utility in a wide variety of applications and are especially useful as inflator filter units in automotive airbags where high temperature resistance as well as strength and flexibility are required. Additionally, the ceramic papers of the present invention appear to optimize filter efficiency and provide little, if any, dustiness.

The inorganic ceramic papers of the present invention preferably have a thickness ranging from about 0.0762 cm to 0.635 cm (or from about 0.03 inches to 0.25 inches) and include inorganic ceramic fibers and an inorganic binder system of fibers consisting essentially of 100 percent silica. However, the binder system is inorganic only as an end result of the process of producing the ceramic paper. That is, the ceramic paper is initially formed into a mat on-line with organic materials included as binders. However, once the formation of the ceramic paper mat is complete, the ceramic paper is taken off-line and the organic materials are burned out or annealed in ovens at extreme temperatures such that all organic material is removed. Importantly, however, the ceramic paper does not break or fall apart. Instead, the paper is held together by inorganic fibers consisting essentially of 100 percent silica. Accordingly, as an end product, the ceramic paper is completely organics-free and includes as a binder, the fibers consisting essentially of 100 percent silica.

For the purposes of this invention, it should be understood that the term "on-line" refers to the process steps which are employed on the production line for the general formation of the ceramic paper. These steps may include mixing, weaving (if necessary), rolling and even annealing, where necessary, usually at certain temperatures well below 1000° F. These steps typically occur in the papermaking machine. It should also be understood that the term "off-line" refers to the process steps which are not employed on the production line. Typically, these steps are performed after the ceramic paper has been produced, but not yet finished, and require the physical removal of the ceramic paper from the production line or papermaking machine. For example, in the present invention, the ceramic paper is initially formed from a composition of inorganic fibers and a binder system which includes both inorganic and organic materials. In order to provide the ceramic paper with a totally inorganic binder system, the organic materials must be burned off. This is done by removing the ceramic paper from the production line and placing the paper in an oven as detailed hereinbelow.

With respect to the initial production of the ceramic paper, inorganic ceramic fibers are mixed with a plurality of different inorganic and organic materials suitable for holding or binding the ceramic fibers together, so as to form a mixture or slurry. Any mixing means may be used, but preferably the fibrous components are mixed at about a 0.5% consistency or solids content (0.5 parts solids to 99.5 parts water) with Lightnin' Mixers in polypropylene stock chests. The slurry is then diluted with water to enhance formation, and it is finally flocculated with binder and drainage retention aid chemicals. Then, the flocculated mixture or slurry is place onto a papermaking machine to be formed into a ceramic paper mat using no dandy mils or presses. The mats or sheets are formed by vacuum casting the slurry or mixture with conventional papermaking equipment and are typically dried in ovens generally heated to 200° F. to 600° F. However, at this point the process of producing the ceramic paper of the present invention is not completed. After the mat is formed, it is taken off-line and placed in a high temperature oven to burn out all of the organic materials in the mat. Desirably, the ceramic paper is heated in the oven at a temperature of about 1000° F. to about 1500° F., preferably about 1300° F. to about 1500° F. for about 2 to about 10 minutes, although the temperature and the time for heating may vary depending on the type of oven used.

Notably, the initial mixture components include inorganic ceramic fibers and a binder system having a plurality of different inorganic and organic materials. More particularly, the composition may comprise a plurality of different grades of inorganic ceramic fibers. Desirably, about 10 to about 50 percent by weight bulk inorganic spun ceramic fibers, about 10 to about 80 percent by weight coarse-chopped inorganic spun ceramic fibers, and 0 to about 10 percent by weight blown ceramic fibers are used (percentages based on total weight of dried mixture solids). Optimally, about 36 percent by weight bulk spun ceramic fibers, about 36 percent by weight coarse-chopped spun ceramic fibers, and 1 percent by weight blown ceramic fibers are employed. Such ceramic fibers particularly useful in making the ceramic papers of the present invention are commercially available from and marketed by The Carborundum Company of Niagara Falls, N.Y., under the registered trademark Fiberfrax. These inorganic fibers are ceramic types produced from alumina and silica, such as vitreous aluminosilicate fibers. Alternative useful ceramic fibers include mineral wool fibers, zirconia fibers, zirconia tow, conventional silica fibers, alumina fibers and mixtures thereof. However, it should be understood that this list of fibers is a representative sample only, and that other ceramic fibers may also be suitable for the purposes and under the conditions detailed herein.

The binder system for the ceramic fiber mixture provides strength and flexibility to the composition and, most importantly, holds the ceramic paper together. That is, the binder system incorporated therein helps to keep the paper from cracking or falling apart during processing on the papermaking machine, during burn out in the oven and thereafter, for the life of the ceramic paper.

In order to make the ceramic paper crack resistant, a plurality of organic binder materials may be provided initially as part of the binder system in the on-line formation of the ceramic paper. In the preferred embodiment, at least two organic latexes are employed. First, from about 1 to about 5 percent by weight, and preferably about 2 percent by weight of an elastic type of latex material such as a modified acrylic with a small amount of bonded nitrogen dispersed therein is provided which permits the ceramic paper to be processed on-line without cracking on the papermaking machine. Suitable latex materials having these characteristics are commercially available acrylic ester copolymers.

The second latex is a very stiff, flame retardant halogenated latex material which is preferably added to the mixture in an amount ranging from about 2 to about 10 percent by weight, preferably about 4 percent by weight. This latex material is generally believed to control the rate at which the gas escapes from the ceramic fiber mat during the off-line burn out stage in order to maintain the thickness and integrity of the ceramic paper during this process. Suitable latex materials having these characteristics are commercially available chlorinated vinylidene/butadiene latexes.

However, in order for the ceramic paper to remain in one piece and not to fall apart after the burn out stage, an inorganic binder material capable of withstanding the extreme temperatures within the oven utilized in the burn out stage must also be present. One such inorganic binder material includes fibers consisting essentially of 100 percent silica. These fibers have an average length ranging from about 1 to about 3 inches and generally comprise from about 1 to about 50 percent by weight of the ceramic paper mixture solids. Importantly, as noted herein, the silica fibers are not burned out of the composition like the organic materials. Instead, the silica fibers tend to flow in a manner which allows them to hold the ceramic fibers together. Moreover, the silica does not become brittle when dried, and therefore, does not crack like other inorganic binder materials. It stays flexible even at annealing temperatures and is not as dusty as are many other types of fibers. Specific representative examples of useful fibers consisting essentially of 100% silica are produced by BP Chemicals (Hitco) Inc. of Santa Ana, Calif., under the trademark Refrasil®, as well as by Sumitomo Corp. of Japan under the trade name Sandtex, a product commercially available through ordinary channels of commerce. Such silica fibers may be produced from standard glass fibers such as E-glass, by treating the glass fibers in an acid bath such that every other material is leached from the fibers except silica.

In addition, other ingredients commonly used in producing ceramic papers may be included in the production thereof. Specifically, ingredients such as alum, a drainage retention aid polymer, and a dispersant may be included. It should be understood, however, that other commonly used ingredients may be employed without departing from the spirit of the invention as claimed hereinbelow.

As commonly known, alum is used to precipitate the organic latexes onto the surface of the fibers. In the presence of alum, the latex which is negatively charged readily coats the fibers. Varying levels of alum may also be used to impart more rigidity or flexibility to the paper mats. Preferably, from about 0.5 to 2 percent by weight alum is used. A drainage retention aid polymer, a positively charged polymer, then pulls the negatively charged coated fibers together and allows any free water to be removed. One such drainage retention aid polymer commercially available from Nalco Chemicals of Naperville, Ill., is Nalco 7530, an acrylamide modified cationic copolymer. Preferably, from about 0.1 to 0.4 percent by weight drainage retention aid is employed. A dispersant may also be used to prevent the ceramic fibers from breaking apart such as by aiding mixing through the neutralization of static charges in the system. One such suitable dispersant is commercially available polyethylene oxide. Preferably, from about 0.05 to 0.2 percent dispersant is used.

In order to demonstrate the manufacture of the completely inorganic ceramic paper, the following formulation was prepared and made into a ceramic paper on a rotoformer papermaking machine.

TABLE 1

| Ingredient | Weight Percent |
| --- | --- |
| Coarse-Chopped Spun Ceramic Fiber[a] | 36 |
| Bulk Spun Ceramic Fiber[b] | 36 |
| Blown Ceramic Fiber[c] | 1 |
| 100% Silica Fiber[d] | 20 |
| Halogenated, Flame Retardant Latex[e] | 4 |
| Elastic Processing Latex[f] | 2 |
| Alum @ 48.8 wt % | 0.65 |
| Drainage Retention Aid Polymer[g] | 0.25 |
| Dispersant[h] | 0.1 |
| Total | 100 |

[a]7010 Coarse-Chopped RCF available from The Carborundum Company, Fibers Division, Niagara Falls, N.Y.
[b]7010T Bulk RCF available from The Carborundum Company, Fibers Division, Niagara Falls, N.Y.
[c]7000 AB RCF available from The Carborundum Company, Fibers Division, Niagara Falls, N.Y.
[d]Refrasil F100-A200 silica fiber
[e]Chlorinated vinylidene/butadiene latex.
[f]Acrylic ester copolymer latex.
[g]Acrylamide modified cationic copolymer.
[h]Polyethylene oxide.

More specifically, the above formulation was prepared by forming an aqueous slurry of the ceramic fibers and other inorganic fibers and organic materials by mixing them in water (from about 0.1% to 1% consistency, and preferably 0.5% consistency). This mixing procedure is well known in the art and is a standard technique in the industry.

After mixing, the mixture or slurry was passed through a rotoformer papermaking machine to deliquify the composition and to form a mat of fibers which essentially make up the ceramic paper. No dandy rolls or presses were used in making the ceramic paper mat, however these may be utilized in its manufacture. The operating procedure of the papermaking machine is also well known in the art and the technical conditions necessary to achieve sufficient deliquification of the mixture to form the mat on this papermaking machine or any other type of papermaking machine may be determined by one of ordinary skill in the art without undue experimentation.

Once the ceramic paper had been formed, it was then taken off-line and annealed in a high-temperature oven at approximately 1400° F. for approximately 6 minutes. It is believed that an oven fired at least at approximately 1000° F. will be sufficient to burn out all the organic materials in the ceramic paper composition. Accordingly, the essential components left as part of the ceramic paper include ceramic fibers and an inorganic binder system of fibers consisting essentially of silica. Preferably, the ceramic paper is composed of from about 50 to about 99 percent by weight ceramic fibers and from about 1 to about 50 percent by weight silica.

Having produced an inorganic ceramic paper, it was subjected to the tests listed in the Table below. As indicated in the Table, the tests of the above ceramic papers indicated that the paper was fairly strong (tensile) for having no organic content (0% loss on ignition) and had a relatively high permeability. Ceramic papers according to the present invention possess strength, flexibility, porosity and permeability particularly suitable for use in airbag inflator filter units, providing a flow of at least about 65 cubic feet per minute.

TABLE

Physical Data

| Property | Data Range |
| --- | --- |
| Thickness (inches) | |
| @ 4 psf load | 0.055 to 0.090 |
| @ 8 psi load | 0.020 to 0.055 |
| Basis Weight (lbs/3000 sf) | 100 to 200 |
| Tensile Strength (g/in) | 500 to 1000 |
| Fiber Index (%)$^j$ | 50 to 80 |
| Pressure Drop (mm H$_2$O) | 1 to 5 |
| Flow (cfm/sf) | 69 to 290 |
| Loss on Ignition (%)$^k$ | 0 |

$^j$Amount Fiber/(Amount Fiber and Shot)(100)
$^k$Exclusive of water vapor

Thus it should be evident that the ceramic papers of the present invention and its method of manufacture thereof are highly effective in providing the necessary porosity, strength and flexibility properties required for a wide variety of applications. The invention is particularly suited for use as a filter in the inflator unit of an automotive airbag.

One representative form of an airbag module is indicated generally by the numeral 10 in the drawing. It will be appreciated that all of the elements of airbag module 10 can take any form commonly known in the art, except where expressly stated herein. Thus, airbag module 10 is one commonly used in the art. It includes a bag 12 and an inflator body 14. As shown and for ease of description, inflator body 14 is cylindrical. It should be understood, however, that the shape of inflator body 14, while conventional in the art, may or may not affect the shape and design of the elements included in module 10.

Positioned radially centrally within inflator body 14 is an ignitor 16 which may be operatively connected to a sensor (not shown) capable of detecting a frontal collision. Radially outward from ignitor 16 is pressure vessel 18 containing a generant or propellant (not shown) which, when ignited, releases an inflation gas such as nitrogen. The propellant or generant (not shown) most typically used today is sodium azide compressed into solid pellets. Vessel 18 preferably has a plurality of apertures 22 relatively low through its outer wall 24 to permit the gas released by the propellant to escape. The gas then travels through an inflator filter 26 near the periphery of inflator body 14 and into bag 12. Filter 26 includes the ceramic paper of the present invention which is encapsulated in wire mesh 28 to enable the filter paper to withstand the outburst of gas.

Accordingly, in use, as soon as a collision is detected by the sensor, an electric impulse is sent to ignitor 16 which triggers a thermo-chemical reaction by igniting the propellant which, in turn, causes nitrogen or some other inflation gas to be expelled and blasted outwardly through apertures 22 at temperatures reaching approximately 2200° F. The gas, as shown by the arrows in the drawing, passes through filter 26 and inflates bag 12 in about 1/40th of a second. The ceramic paper of filter 26 performs at least three functions during this operation. First, it entraps any unreacted particles used to form, or ash resulting from the formation of, the inflation gas. Second, it cools the gas from its extremely high temperatures. And third, it controls the flow rate of the gas. That is, the ceramic filter paper of the present invention has a controlled porosity for allowing the gas to escape at a controlled rate, thus permitting the gas to cool before entering bag 12.

Moreover, it will be appreciated that the ceramic paper of the present invention is inorganic and as such, does not cause outgassing or any of the problems associated with organic materials in filter 26 such as variable pressure and temperature levels as described hereinabove. Thus, it should be evident that the ceramic paper of the present invention is highly efficient and provides the porosity, strength and flexibility properties required for use as an inflator filter in an automotive airbag. Less generant can be used as well as less filter material, because of its high filtering efficiency. Moreover, the ceramic paper and method of the present invention can be used separately with other equipment and the like in household as well as other industrial applications, including being used in heating elements and kilns.

Based upon the foregoing disclosure, it should be apparent that the use of the ceramic paper described herein will carry out the objects set forth hereinabove. It is, therefore, to be understood that any variations evident fall within the scope of the claimed invention and thus, the selection of specific component elements can be determined without departing from the spirit of the invention herein disclosed and described. In particular, the types or grades of ceramic fiber utilized according to the present invention are not necessarily limited to those detailed hereinabove. Moreover, as noted hereinabove, other types of papermaking equipment such as vacuum casters, fourdrinier machines, twin wire formers, etc., other burn-out ovens and high temperature ovens for heating the product off-line such as kilns, Rockwell ovens, etc., can be substituted for the rotoformer papermaking machine and high-temperature oven discussed above, respectively. Thus, the scope of the invention shall include all modifications, variations and equivalent embodiments that may fall within the scope of the attached claims.

What is claimed is:

1. An inorganic ceramic paper comprising inorganic ceramic fibers and an inorganic binder of fibers consisting essentially of silica, the ceramic paper being porous, free of all organic materials and having a tensile strength of at least about 500 grams per inch.

2. The inorganic ceramic paper of claim 1, wherein said paper comprises from about 1 to about 50 percent by weight silica fibers.

3. The inorganic ceramic paper of claim 1, wherein said inorganic binder initially includes organic binder materials, but which are burned out after the paper has been formed to leave said inorganic binder free of all organic binder materials.

4. The inorganic ceramic paper of claim 1, wherein said paper has a flow rate of at least about 65 cubic feet per minute.

5. The inorganic ceramic paper of claim 1, wherein said paper has a tensile strength of at least about 800 grams per inch.

6. The inorganic ceramic paper of claim 1, wherein said silica fibers range from about 1 to about 3 inches in length.

7. The inorganic ceramic paper of claim 1, wherein said paper ranges from about 0.03 inches to about 0.25 inches in thickness.

8. The inorganic ceramic paper of claim 1, wherein said ceramic fibers are selected from the group consisting of aluminosilicates, mineral wool, zirconia, zirconia tow, conventional silica, alumina and mixtures thereof.

9. Inorganic ceramic paper comprising a composition of inorganic ceramic fibers and an inorganic binder of fibers consisting essentially of silica, produced by mixing the inorganic ceramic fibers, the silica fibers and organic binder to produce a mixture; diluting said mixture with water; flocculating said mixture with said organic binder and a drainage retention aid; forming a ceramic paper mat from said mixture; and burning out all organic material in said ceramic mat, whereby said silica fibers hold the ceramic fibers together, said inorganic ceramic paver having a tensile strength of at least about 500 grams per inch.

10. Inorganic ceramic paper, as set forth in claim 9, wherein said ceramic paper mat is formed on-line on a papermaking machine and then removed therefrom in order to burn out said organic materials.

11. Inorganic ceramic paper, as set forth in claim 9, wherein said step of burning out all organic material is performed in an oven heated to at least about 1300° F.

12. Inorganic ceramic paper, as set forth in claim 9, wherein said step of burning out all organic material is performed in an oven heated to at least about 1000° F.

13. Inorganic paper, as set forth in claim 9, wherein said organic binder includes a first and second latex, the first latex for preventing said ceramic paper mat from cracking during forming and the second latex for controlling the rate at which gas escapes from said ceramic paper mat during said burning out.

14. Inorganic paper as set forth in claim 13 wherein said mixture comprises, by weight, about 10 to about 50% bulk spun ceramic fiber, about 10 to about 80% coarse chopped ceramic fiber, 0 to about 10% blown ceramic fiber, about 1 to about 50% silica fibers, about 1 to about 5% first latex and about 2 to about 10% second latex.

15. Inorganic paper as set forth in claim 14 wherein said mixture further comprises, by weight, about 0.1 to about 0.4% drainage retention aid, and about 0.05 to about 0.2% dispersant.

16. Inorganic ceramic paper, as set forth in claim 9, wherein said paper has a flow rate of at least about 65 cubic feet per minute.

17. Inorganic ceramic paper, as set forth in claim 9, wherein said paper has an tensile strength of at least 800 grams per inch.

18. Inorganic ceramic paper, as set forth in claim 9, wherein said paper ranges from about 0.03 inches to about 0.25 inches in thickness.

19. Inorganic ceramic paper, as set forth in claim 9, wherein said mixture further comprises a dispersant.

* * * * *